(12) United States Patent
Cao

(10) Patent No.: US 10,030,913 B1
(45) Date of Patent: Jul. 24, 2018

(54) HEAT PIPE DRY COOLING SYSTEM

(71) Applicant: Yiding Cao, Miami, FL (US)

(72) Inventor: Yiding Cao, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/873,517

(22) Filed: Jan. 17, 2018

(51) Int. Cl.
| F28D 15/00 | (2006.01) |
| F28D 15/02 | (2006.01) |
| F24J 2/32 | (2006.01) |
| F24S 10/90 | (2018.01) |
| G21C 15/257 | (2006.01) |

(52) U.S. Cl.
CPC .......... F28D 15/0266 (2013.01); F24J 2/32 (2013.01); F24S 10/90 (2018.05); F28D 15/0275 (2013.01); G21C 15/257 (2013.01)

(58) Field of Classification Search
CPC ..... F28D 15/0266; F28D 15/0275; F24J 2/32; F24J 2/204; G21C 15/257; F24F 1/0059; F24F 3/14

USPC .................................................... 165/104.11
See application file for complete search history.

(56) References Cited

U.S. PATENT DOCUMENTS

| 4,211,207 | A | * | 7/1980 | Molivadas | ............... | F24J 2/204 |
| | | | | | | 126/587 |
| 6,591,902 | B1 | * | 7/2003 | Trent | ..................... | F24F 1/0059 |
| | | | | | | 165/104.14 |
| 2008/0083231 | A1 | * | 4/2008 | Wang | ........................ | F24F 3/14 |
| | | | | | | 62/93 |
| 2009/0126364 | A1 | * | 5/2009 | Mills | ....................... | F01K 9/003 |
| | | | | | | 60/641.8 |

* cited by examiner

*Primary Examiner* — Davis Hwu
(74) *Attorney, Agent, or Firm* — Saliwanchik, Lloyd & Eisenschenk

(57) ABSTRACT

A dry cooling system can include: a heat source flow duct; an air duct disposed over the heat source flow duct; an opening between the heat source flow duct and the air duct such that an air flows through the opening; and a heat pipe including an evaporator section disposed in the heat source flow duct and a condenser section disposed in the air duct. The air can flow from the opening to the condenser section.

15 Claims, 16 Drawing Sheets

Colder water return

HEAT PIPE DRY COOLING SYSTEM

BACKGROUND

One of the ultimate ways to conserve water for thermo-electric power plants, nuclear power plants, concentrating solar power (CSP) plants, or centralized air conditioning/refrigeration systems is dry cooling. However, significant fan power consumption and significantly increased construction costs may inhibit dry cooling from commercial adoption. It has been estimated that, for a power plant, the dry cooling power consumption (primarily fan power consumption) could be up to 10% of the total power production of the power plant under hot weather conditions. The construction cost of a dry cooling facility for a 500 MW power plant could be up to five times higher than the cost of a wet-cooling tower.

The current approaches to achieve power plant dry cooling include compact condenser designs, micro tube heat exchangers for power plant condensers, dry and parallel condensing systems, and power plant heat rejection systems incorporating thermos-syphon cooler (TSC) technology. However, many of the approaches mentioned above may incur significant fan power consumption. In general, the heat transfer coefficient associated with airflow may be three orders of magnitude lower than that associated with a water flow due to a low air density. As a result, a large airflow volume is required for the dry cooling, which would incur exceedingly high fan-power consumption to circulate required airflow volume.

Under the condition of neglecting the thermal resistance from the cooling water to the interior surface of the container and that across the container wall, the well-known Newton's Law of cooling may be used to analyze the heat transfer from the condenser cooling water of a power plant or an air-conditioning/refrigerator system to the ambient air in terms of a dry cooling system:

$$\overline{Q}=Ah\Delta T$$

where, $\overline{Q}$ is the heat transfer rate from the cooling water to the ambient air, A is the total heat transfer surface area, h is the heat transfer coefficient, and $\Delta T$ is the mean temperature difference between the cooling water and the ambient air. It may be seen from the above equation that to promote the heat transfer rate, three approaches may be employed: increasing the heat transfer surface area; increasing the heat transfer coefficient; or increasing the temperature difference. However, the ambient air temperature cannot be controlled and the heat transfer surface temperature is limited by the cooling water temperature that cannot be too high above the ambient temperature, which leaves the other two choices as the variables for an increased heat transfer rate. It is well known that the heat transfer coefficient, h, is predominantly determined by the flow speed of the air relative to the heat transfer surface. To attain a high air velocity, large fan-power consumption is needed. Free or natural convection does not consume power, but its heat transfer coefficient is generally very low. However, it is believed that a combination of an increased heat transfer surface area and the enhanced free convection heat transfer coefficient may adequately remove the heat from the condenser without incurring significant fan-power consumption. Additionally, solar energy may be employed to enhance the airflow for a higher heat removal rate from the condenser. Similarly, the steam or vapor inside a condenser may be directly condensed using the aforementioned approach without involving the use of condenser cooling water.

BRIEF SUMMARY

Embodiments of the subject invention provide novel and advantageous heat pipe dry cooling systems that comprise a heat pipe evaporator section in contact with a heat source in a cooling water flow duct and a heat pipe condenser section transferring heat to air in an air duct.

In an embodiment, a dry cooling system can comprise: an air duct; and a heat pipe including an evaporator section configured to be in contact with a heat source and a condenser section connected to the evaporator section, the condenser section being located in the air duct.

In another embodiment, a dry cooling system can comprise: a heat source flow duct; an air duct disposed over the heat source flow duct; an opening between the heat source flow duct and the air duct such that an air flows through the opening; and a heat pipe including an evaporator section disposed in the heat source flow duct and a condenser section disposed in the air duct, the air flowing from the opening to the condenser section.

In yet another embodiment, a dry cooling system can comprise: a heat source flow duct including a heat source; an air duct disposed over the heat source flow duct; an opening between the heat source flow duct and the air duct; a heat pipe including an evaporator section disposed in the heat source of the heat source flow duct and a condenser section disposed in the air duct; a window disposed on the air duct; a solar absorbing element disposed over the condenser section; and a fan disposed over the solar absorbing element, the dry cooling system being configured to allow an air to flow from the opening to outside of the air duct through the condenser section, the solar absorbing element, and the fan.

Embodiments of the present invention provide a dry cooling system that combines heat-pipe heat-spreading function and buoyancy-force induced free convection cooling to remove heat from the condenser of a power plant, an air conditioning/refrigeration system, or other heat sources without incurring significant fan-power consumption. A heat pipe of the subject invention absorbs heat from the heat source through the heat pipe evaporator section of the heat pipe and spread the received heat to the heat pipe condenser section of the heat pipe having a much larger heat transfer surface area that is disposed inside an air duct. The heat pipe condenser section is oriented generally upwardly and the ambient air is induced from bottom openings of the air duct, creating buoyancy force induced airflow within the air duct. The airflow removes heat from the condenser section of the heat pipe and is discharged from an upper section of the duct.

Embodiments of the subject invention utilize solar energy to create airflow draft to enhance the airflow inside the dry cooling system. This is accomplished by deploying transparent solar windows in combination with solar absorbing elements inside the air duct. Solar beams strike the windows, transmitting through the windows, and are absorbed by the solar absorbing elements deployed inside the air duct, raising their temperature. The solar absorbing elements with a higher temperature then transfer the received heat to the airflow within the duct, or store the received solar energy and transfer it to the airflow when the solar energy is not available.

Embodiments of the subject invention can also employ solar collectors such as heliostat or Fresnel solar collectors to direct the received soar energy to solar absorbing elements through the solar windows to further increase the airflow temperature and consequently further enhance airflow speed to remove heat from the condenser section of the heat pipe.

DETAILED DESCRIPTION

Embodiments of the subject invention provide novel and advantageous heat pipe dry cooling systems that comprise a heat pipe evaporator section in contact with a heat source in a cooling water flow duct and a heat pipe condenser section transferring heat to air in an air duct.

Figure 1:
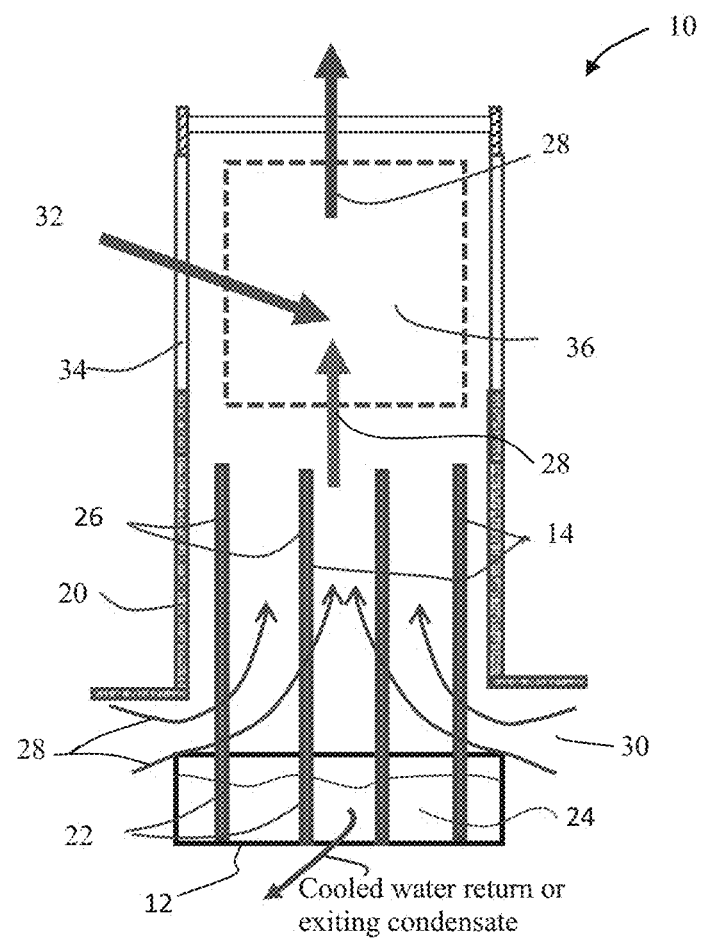
FIG. 1 shows a schematic illustration of a sectional view of a dry cooling system according to an embodiment of the subject invention.

FIG. 1 shows a schematic illustration of a sectional view of a dry cooling system according to an embodiment of the subject invention. The dry cooling system 10 of FIG. 1 shows an application of removing heat from the condenser cooling water of a power plant or a centralized air condition/refrigeration system. Referring to FIG. 1, the dry cooling system 10 comprises a cooling water flow duct 12 (e.g., a heat source flow duct or a condenser), a plurality of heat pipes 14, and shielding structures that house the heat pipes 14 and form an air duct 20. An important function of the shielding structure is to inhibit solar beams from striking the heat pipes 14, but it could allow ambient air to flow into the air duct 20. Each of the heat pipes 14 has a heat pipe evaporator section 22 in contact with a cooling water 24 and receiving heat from the cooling water 24. The heat pipe evaporator section 22 transfers the received heat to a heat pipe condenser section 26 of the heat pipe connected to and disposed above the heat pipe evaporator section 22, where the heat is rejected from the heat pipe condenser section 26 to an air stream 28 that is induced into the air duct 20 through an opening 30 near the bottom section of the air duct 20.

As discussed above, the keys to minimize fan-power consumption are to increase the heat transfer surface area and enhance free or natural convection heat transfer coefficient. The increase of the heat transfer surface area is secured by the use of the heat pipe 14 that is an excellent thermal conductor. Because of this unique feature, the heat transfer surface area of the heat pipe condenser section 26 can be significantly increased with a small temperature drop between the heat pipe evaporator section 22 and the heat pipe condenser section 26. In another embodiment, fins may be attached to the heat pipe condenser section 26 (not shown). Even though the heat transfer area has been significantly increased, the heat transfer coefficient may still need to be enhanced for the objective of free convection cooling, which is normally associated with a low heat transfer coefficient. For this purpose, buoyancy-force induced free convection cooling is realized. As seen in FIG. 1, an air stream 28 in contact with the heat pipe condenser section 26 receives heat from the heat pipe condenser section 26 and becomes warmer. Due to the buoyancy force effect, the warmer air flows upwardly and induces the ambient air 28 into the air duct 20 through the openings 30 near the bottoms of the duct, creating enhanced free convection cooling.

Although the solar flux may not be desirable to reach the heat pipe condenser section 26, a first solar beam 32 may be employed to heat the airflow stream above the heat pipe condenser section 26 to create draft and further enhance the free convection in the air duct 20. In this embodiment, transparent solar windows 34 (e.g., first windows or side windows) are disposed in combination with solar absorbing elements 36. The first solar beams 32 penetrate through the transparent windows 34 and are absorbed by the solar absorbing elements 36, raising their temperature. The solar absorbing elements 36 of a higher temperature transfer the absorbed heat to the air 28 flowing through the solar absorbing elements 36, further raising air temperature to create a solar chimney effect and enhance free-convection flow.

In an embodiment, the air draft depends on the height of the dry cooling system 10 and the average temperature of the airflow in the air duct 20 above the ambient temperature. The amount of the solar energy receivable is limited by the size of the transparent solar windows 34 shown in FIG. 1 as well as the striking angle of the first solar beams 32 onto the transparent solar windows 34.

Figure 2:
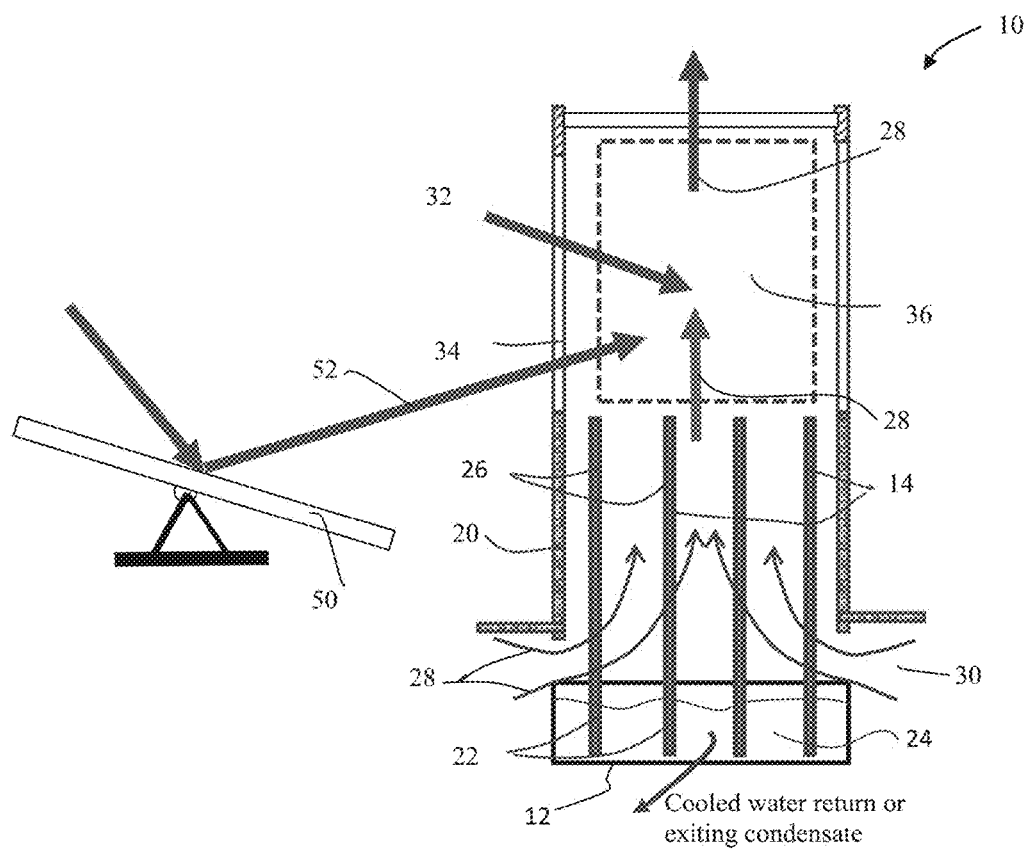
FIG. 2 shows a schematic illustration of a sectional view of a dry cooling system according to an embodiment of the subject invention.

FIG. 2 shows a schematic illustration of a sectional view of a dry cooling system according to an embodiment of the subject invention. Referring to FIG. 2, the dry cooling system 10 can further comprise a solar collector 50 providing a second solar beam 52 to the solar absorbing element 36 through the transparent solar window 34. That is, the amount of the solar energy that is added to the dry cooling system 10 can be substantially increased by the use of the solar collectors 50, which deliver additional solar beam 52 into the dry cooling system 10. The solar collectors 50 may include but not limited to heliostat or Fresnel solar collectors. The use of solar collectors 50 may significantly increase the amount of the solar energy input to the drying cooling system 10 to further enhance the air-flow draft and minimize the adverse effect of variation in the striking angle of the solar beams.

Figure 3:
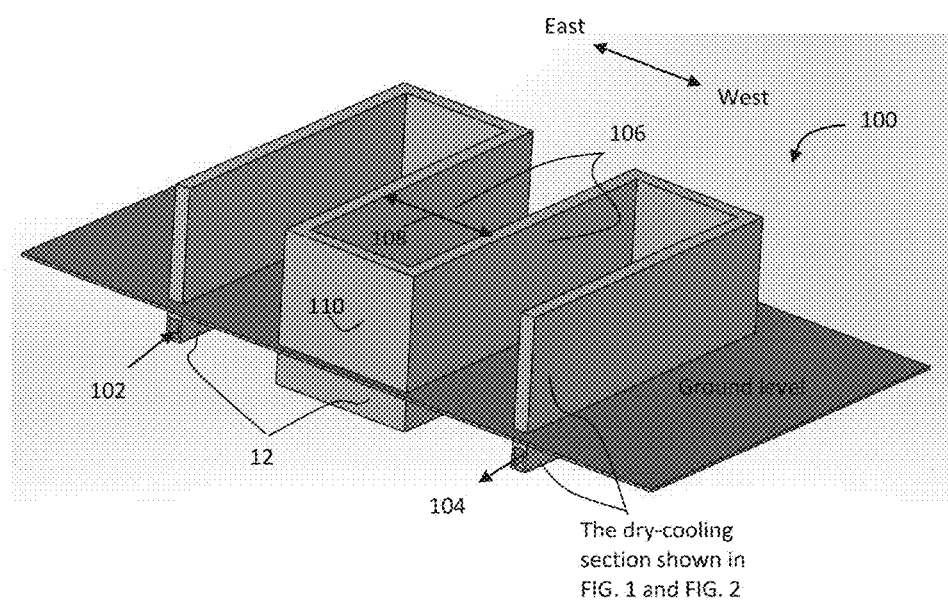
FIG. 3 shows a three-dimensional schematic, perspective illustration showing an exemplary layout of a dry cooling system according to an embodiment of the subject invention.

While FIGS. 1 and 2 show only sectional illustrations of the dry cooling systems, FIG. 3 shows a three-dimensional schematic deployment of a dry cooling system in accordance with an embodiment of the present invention. Referring to FIG. 3, the dry cooling system 100 comprises the cooling water flow duct 12 below a ground level and a dry cooling wall 106 above the ground level. The cooling water of a power plant or an air conditioning/refrigeration system enters into the dry cooling system 100 through a cooling water inlet 102 after removing heat from a condenser (not shown). The cooling water in the cooling water flow duct 12 exits from the dry cooling system 100 through a cooling water outlet 104 with a lowered temperature and is circulated back to the condenser for a closed-loop water cooling system. For an open-loop cooling system, the cooling water exited from the cooling water outlet 104 may be released into a river, an ocean, or a reservoir (not shown). Although it is not always necessary, in the embodiment shown in FIG. 3, the cooling water flow duct 12 (also shown in FIGS. 1 and 2) is located below the ground level. If the solar energy utilization is not an issue, the orientation of the dry cooling system 100 (or walls 106) is not essential so long as the space between adjacent walls is sufficiently large to accommodate fresh ambient air intake into the dry cooling walls 106. However, if the solar energy input is important to the dry cooling operation, the dry cooling walls 106 may be disposed in such a way that they are generally perpendicular to the East-West direction as illustrated in FIG. 3. Also, a distance 108 between the adjacent walls 106 should be sufficiently large to minimize mutual blockage of solar beams into the walls 106 or to allow the deployment of solar collectors if necessary. In addition, if the required distance 108 between the adjacent walls 106 is so great for solar input, the front wall segment 110 that links the adjacent walls 106 may be removed, leaving out only the cooling water flow duct 12 for continuing water circulation.

The dry cooling system is highly modular; depending on the cooling load, the length of the cooling system wall may be increased or decreased. The modularity is one of the greatest advantages of the present system in terms of the costs, which may avoid the requirement for exceedingly total air ducts or dry cooling walls for a high air draft. Instead, the tall cooling wall may be traded for a relatively short wall but with an increased length. If the drying system involves only the water coolant, power plants/air conditioning systems may adopt the present systems without the requirement to modify existing condensers. Additionally, as shown in FIG. 3, the cooling water flow duct 12 of power plants or air conditioning/refrigeration systems may be inexpensively laid underground and because of the low pressure flow in the water duct, non-mechanic containers may be used, further reducing the cost of the system.

The dry cooling system of embodiments of the subject invention can also be employed for direct cooling of a condenser without employing cooling water for power plants or air conditioning/refrigeration systems. In this embodiment, the heat pipe evaporator section 22 (FIGS. 1 and 2) are directly integrated with the condenser and receive heat directly from steam/vapor, two-phase mixture, or condensate 24 (FIGS. 1 and 2). In FIG. 3, steam or vapor enters into a condenser 12 through the inlet 102 and condensate exits from the condenser 12 through the outlet 104. The deployment of the condenser 12 may also be flexible and may not be located underground. Instead, the ground level as shown in FIG. 3 may be replaced by a roof level to accommodate the linkage of the condenser with other equipment of a power plant or air conditioning/refrigeration system. Furthermore, the ground or roof level may be completely removed for a different deployment of the dry cooling system (not shown) for a water cooled condenser or a directly cooled condenser by heat pipes.

The applications discussed so far are related to heat removal from the condenser cooling water or directly from the condenser for power plants or air conditioning/refrigeration systems. However, the same approach can be employed for heat removal from a fluid (either liquid or gas) related to any other industrial, commercial, or residential applications.

The working fluid of the heat pipe to be used in the present system may include, but is not limited to, water, ammonia, methanol, acetone, or refrigerants. Heat pipes including two-phase closed thermos-syphons are two-phase heat transfer devices that may have an effective thermal conductance drastically higher than that of copper. Because of the high thermal conductance, the heat received from a heat source by the heat pipe evaporator section can be effectively spread to the heat pipe condenser section of a much larger heat transfer surface area, resulting in a sufficiently reduced heat flux that is commensurate to the enhanced free-convection cooling capability. The heat pipes have found broad applications in many areas such as energy conversion and conservation, thermal management of aircraft and spacecraft, and electric and electronic cooling. For this terrestrial application, gravity may be used to assist the return of the liquid condensate and a wick structure may not be needed inside the heat pipe. Because of the simplicity of the heat pipe employed, the cost of the dry cooling system may be maintained at an acceptably low level.

Figures 4, 5:
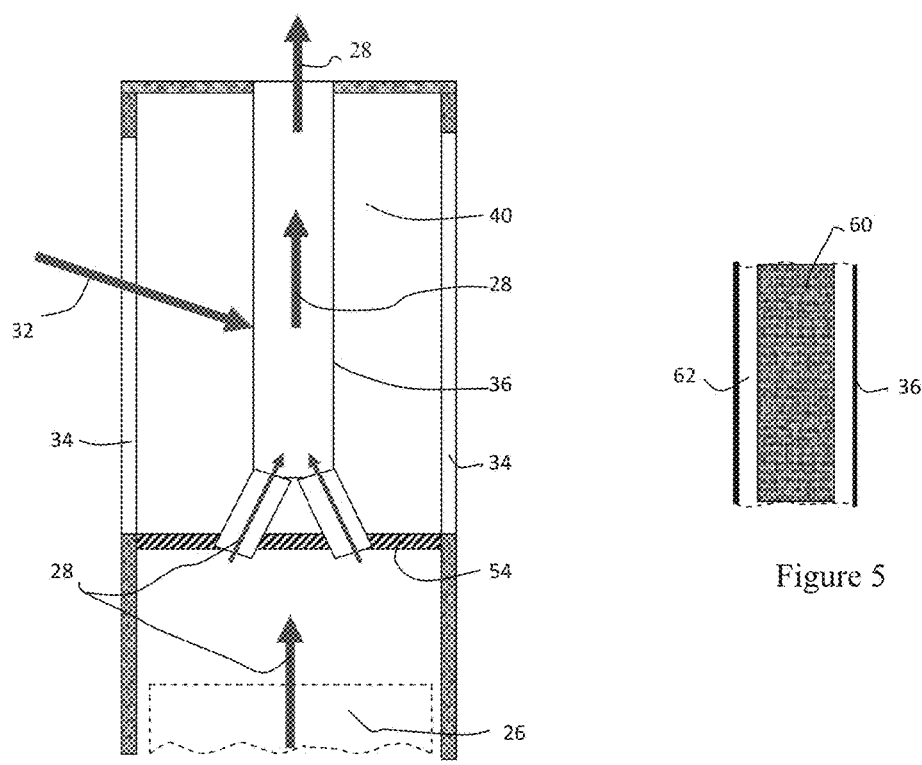
FIG. 4 shows a schematic illustration of a sectional view of a dry cooling system according to an embodiment of the subject invention.
FIG. 5 shows a schematic illustration of a cross-sectional view of a solar absorbing element according to an embodiment of the subject invention.

The solar absorbing elements 36 as shown in FIGS. 1 and 2 may have a variety of configurations. FIG. 4 shows a sectional view of the dry cooling system that illustrates a preferred arrangement of the solar absorbing elements 36. The air 28 exits the heat pipe condenser section 26 and is directed through a partition 54 into an airflow space formed by the solar absorbing element 36 that could receive solar energy from all sides of the solar windows 34. Solar beams, such as 32 shown in the figure, penetrates through the solar window 34 and is absorbed by the element 36 that then transfers the received solar energy to the air 28 within the solar absorbing elements 36, increasing air temperature and creating air draft to enhance the airflow in the dry cooling system. Air 40 trapped within the spaces between the solar windows 34 and the absorbing elements 36 may circulate between the hotter and colder surfaces of the elements, providing a mechanism to reduce the temperature difference over the element surfaces. Although a solar absorbing element with a single airflow space is shown in FIG. 4, absorbing elements with multiple airflow spaces may also be an option (not shown).

The solar energy availability may be intermittent. To overcome this difficulty, thermal energy storage materials in terms of sensible thermal energy storage or latent-heat thermal energy storage using phase-change materials (PCMs) may be incorporated into the solar energy absorbing elements. FIG. 5 shows a cross-sectional view of a solar absorbing element according to an embodiment of the subject invention. Referring to FIG. 5, the solar absorbing element 36 includes an amount of thermal energy storage material 60 at a center space of a first airflow space 62 inside the solar absorbing element 36. When the solar energy is available, the air in the first airflow space 62 is heated and some of the heat received by the air may be transferred to the thermal energy storage material 60 that stores the received energy. When the solar energy is not available, the thermal energy stored within the thermal energy storage material 60 may be released to provide heat to the air in the first airflow space 62. Alternatively, the thermal energy storage material 60 may be disposed in contact with the solar absorbing element 36 while air would flow in a space inside the thermal energy storage material (not shown).

Figure 6A:
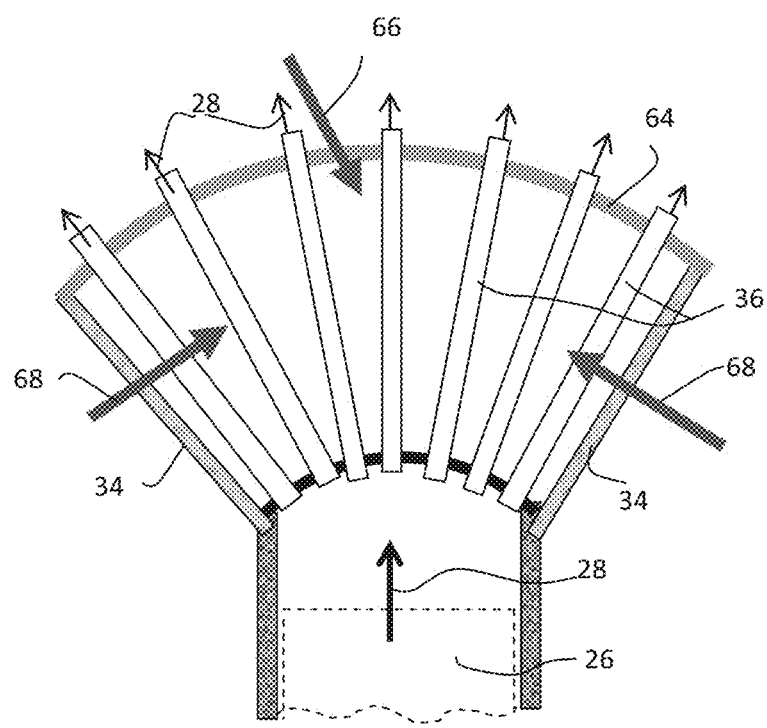
FIG. 6(a) shows a schematic illustration of a sectional view of a dry cooling system according to an embodiment of the subject invention.

FIG. 6(a) shows a schematic illustration of a sectional view of a dry cooling system according to an embodiment of the subject invention. In the embodiment of FIG. 6(a), to increase the solar energy input while minimizing the use of solar collectors, the solar energy may enter the dry cooling system from top of the system. The amount of the solar energy entering from top windows 64 may be significantly increased when the top portion of the dry cooling system that houses the solar absorbing elements 36 takes a divergent configuration to increase the top solar energy receiving area. Referring to FIG. 6(a), the side windows 34 of the dry cooling system may incline from a lower portion of the air duct outwardly at a sufficiently large degree to provide a larger top window 64. Third solar beams 66 strike the dry cooling system from the top and enter the dry cooling system through top windows 64. Air 28 exits the heat pipe condenser section 26 and is guided into the solar absorbing elements 36 to receive heat for an increased air draft. If the solar energy input 68 into the dry cooling system through the use of solar collectors as shown in FIG. 2 is not an option, the side windows 34 may be replaced by solid, opaque structures (not shown).

Figure 6B:
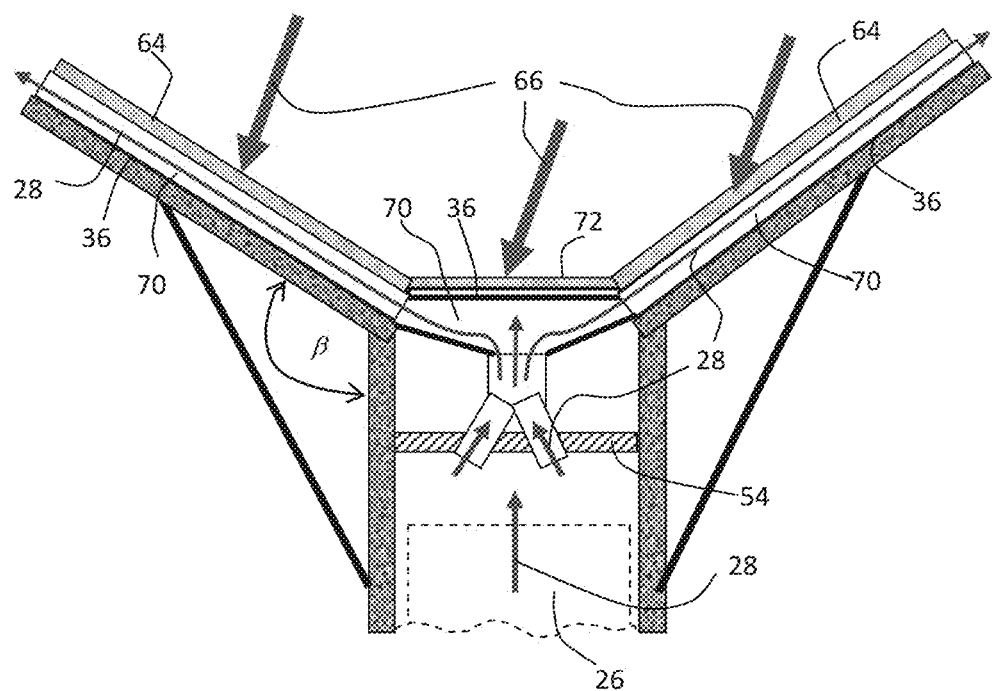
FIG. 6(b) shows a schematic illustration of a sectional view of a dry cooling system according to an embodiment of the subject invention.

FIG. 6(b) shows a schematic illustration of a sectional view of a dry cooling system according to an embodiment of the subject invention. Referring to FIG. 6(b), the dry cooling system has a Y-shaped configuration for an increased solar energy input from the top of the dry cooling system. In this embodiment, first solar receiver panels 64 (e.g., top windows or second windows) branch out to substantially increase the solar receiving area. For a relatively thick dry cooling wall or a large cross-sectional area of a dry-cooling tower, the top area of the dry cooling system may also be covered by a second solar receiver panel 72 (e.g., third window). Air 28 exits the heat pipe condenser section 26 and is directed through the partition 54 into second airflow spaces 70. The third solar beams 66 strike solar windows 64 and 72 is absorbed by the solar absorbing elements 36 that in turn transfer received heat to the air 28 within the second airflow spaces 70 to raise the air temperature and generate airflow draft. The configuration as shown in FIG. 6(b) is an exemplary configuration and there may be many modified variants. If the angle β shown in FIG. 6(b) is 90 degree, the Y shape is reduced to a T-shape. If due to space constraints, only one panel branch 64 is permissible, the configuration would become an L-shape. Thermal energy storage materials may be disposed underneath the solar absorbing elements 36 to store thermal energy for the use when solar energy is not available. Also, the solar panel 72 on top of the dry cooling system may be removed. If the solar energy is not available, the airflow out of the heat pipe condenser section 26 may bypass the solar panel branches 64 and is released into the ambient.

Figure 7:
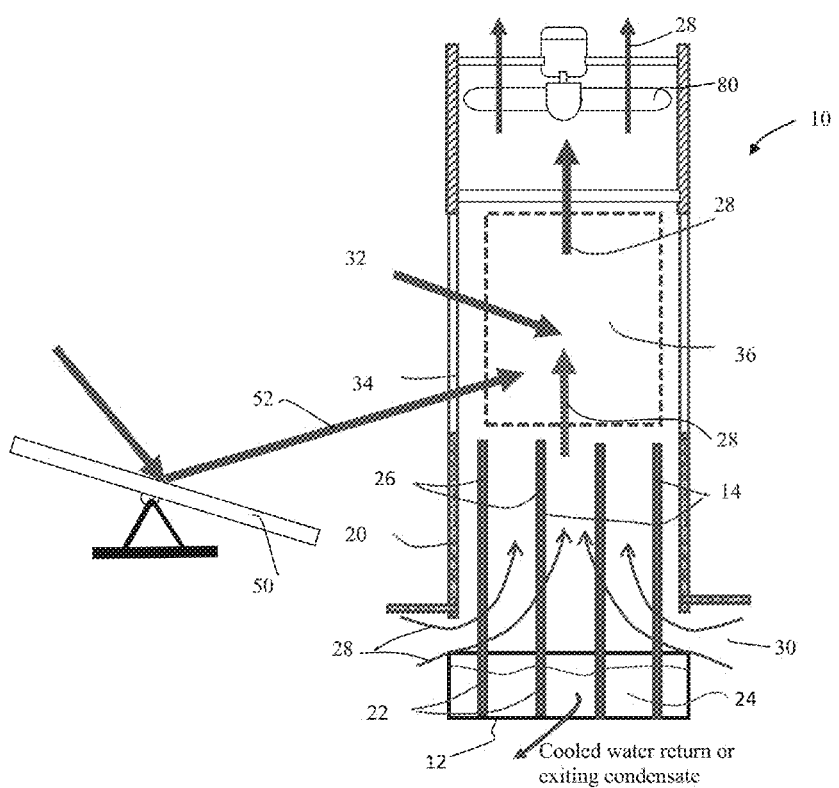
FIG. 7 shows a schematic illustration of a sectional view of a dry cooling system according to an embodiment of the subject invention.

In the embodiments, the cooling function of the dry cooling system is facilitated primarily through passive means such as buoyancy force induced free convection due to the heat transfer from the heat pipe condenser section to the air or solar energy generated draft. However, electric fans may also be disposed to aid the cooling purpose. FIG. 7 shows a schematic illustration of a sectional view of a dry cooling system including the fans. Referring to FIG. 7, electric fans 80 are disposed on the top of the dry cooling system to draw air 28 out of the system, which represents a dry cooling system combining buoyancy force induced free convection, solar energy generated air draft, and forced convection driven by electric fans. Alternatively, the fan may be installed in a section between the heat pipe condenser section 26 and the solar absorbing elements 36 (not shown). Similarly, the fans may also be installed for the system configurations shown in FIGS. 6(a) and 6(b) with the fan being preferably deployed in a location between the heat pipe condenser section and the solar energy absorbing elements (not shown).

Due to the cost and energy consumption of the electric fans, their installation or operation is only an option when the solar energy is not available or not strong enough to aid insufficient buoyancy force induced free convection. When the buoyancy force induced free convection due to the heat transfer from the heat pipe condenser section to the air or the combination of the heat pipe condenser section heating and the solar heating is sufficient for cooling air induction, the installation or operation of electric fans are not necessary. Additionally, some large openings may be optionally provided in the air duct 20 (FIGS. 1, 2, 7, or the figures that will be presented later in this disclosure), but such openings are not shown. The openings may be normally closed, but in some seasons when a windy weather condition is sufficient to remove the heat from the heat pipe condenser section without the aid of the buoyancy force induced free convection or solar energy, the openings may be opened to allow wind to blow through the heat pipe condenser sections of the dry-cooling system (not shown). Finally, the dry cooling system may be combined with a wet-cooling tower to remove the heat from the cooling water of a power plant or an air conditioning/refrigeration system. If the drying cooling can remove sufficient heat from the water, the cooling water may bypass the wet-cooling tower. On the other hand, if the dry cooling system has difficulty removing sufficient heat from the water, some or all of the water could bypass the dry cooling system and is cooled by the wet-cooling tower.

Figure 8:
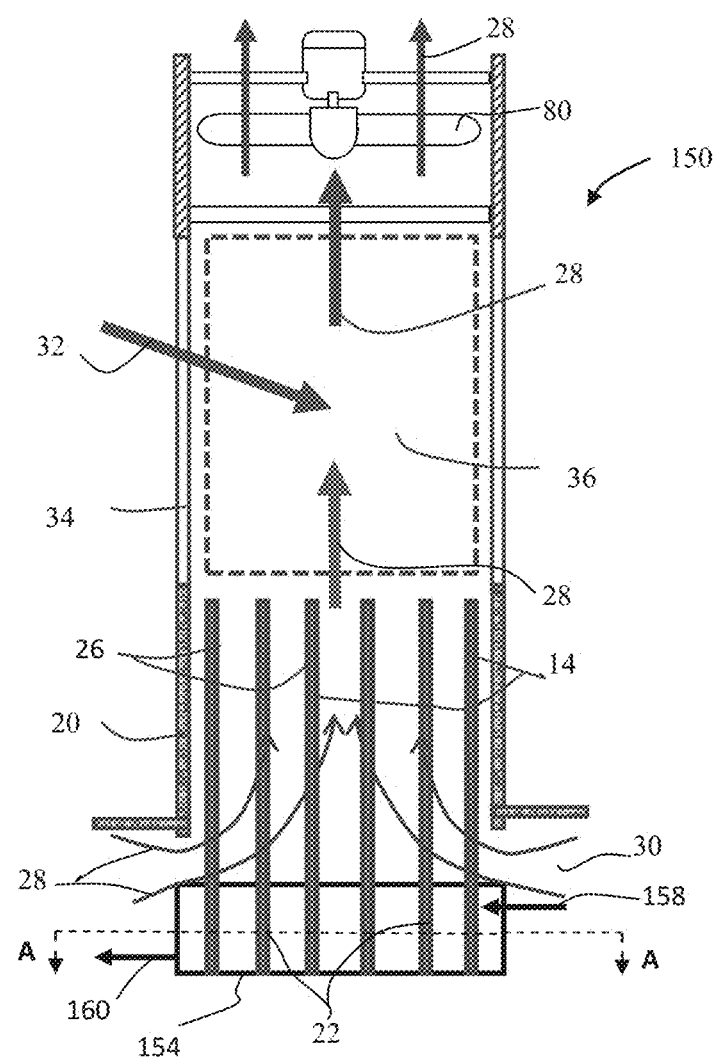
FIG. 8 shows a schematic illustration of a sectional view of a dry cooling system according to an embodiment of the subject invention.
Figure 9:
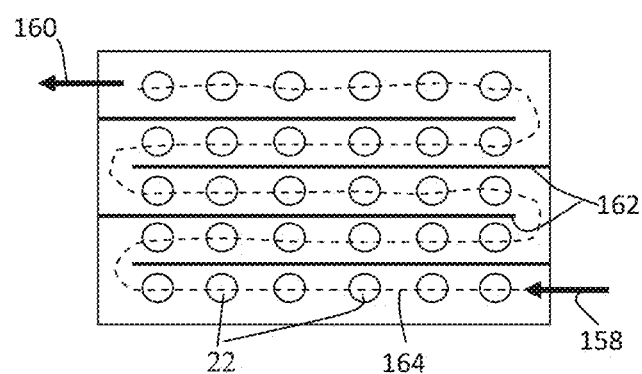
FIG. 9 shows a cross-sectional illustration taken along line A-A of FIG. 8.

The disclosed cooling system may have different sizes and configurations in terms of a wall or a tower of different cross sections, depending on specific applications. FIG. 8 illustrates schematically a dry cooling system having a rectangular cross section for direction cooling of the condenser of an air conditioning or refrigerator system and FIG. 9 shows a cross-sectional illustration taken alone line A-A of FIG. 8. Referring to FIGS. 8 and 9, the heat pipe evaporator sections 22 are directly disposed inside the condenser 154. Vapor 158 flows into the condenser 154 and is condensed due to the heat removal by the heat pipe evaporator section 22. Condensate 160 exits the condenser 154 and flows to the next component of the air conditioning or refrigerator system. Vapor 158 flows into the condenser 154 and is guided by baffles 162 along a serpentine flow path 164 across the heat pipe evaporator sections 22 for effective heat removal (FIG. 9).

An application of the dry cooling system as shown in FIGS. 8 and 9 is associated with a residential split air conditioning system that has a condenser disposed outside of the building. In this embodiment, the heat pipe evaporator sections of the present dry cooling system are deployed inside the condenser to remove the heat from the condenser. The outcome of adopting this dry cooling system is the elimination of condenser cooling fan or substantially reduced fan power consumption with the benefits of an increased energy efficiency and noise reduction.

Figure 10:
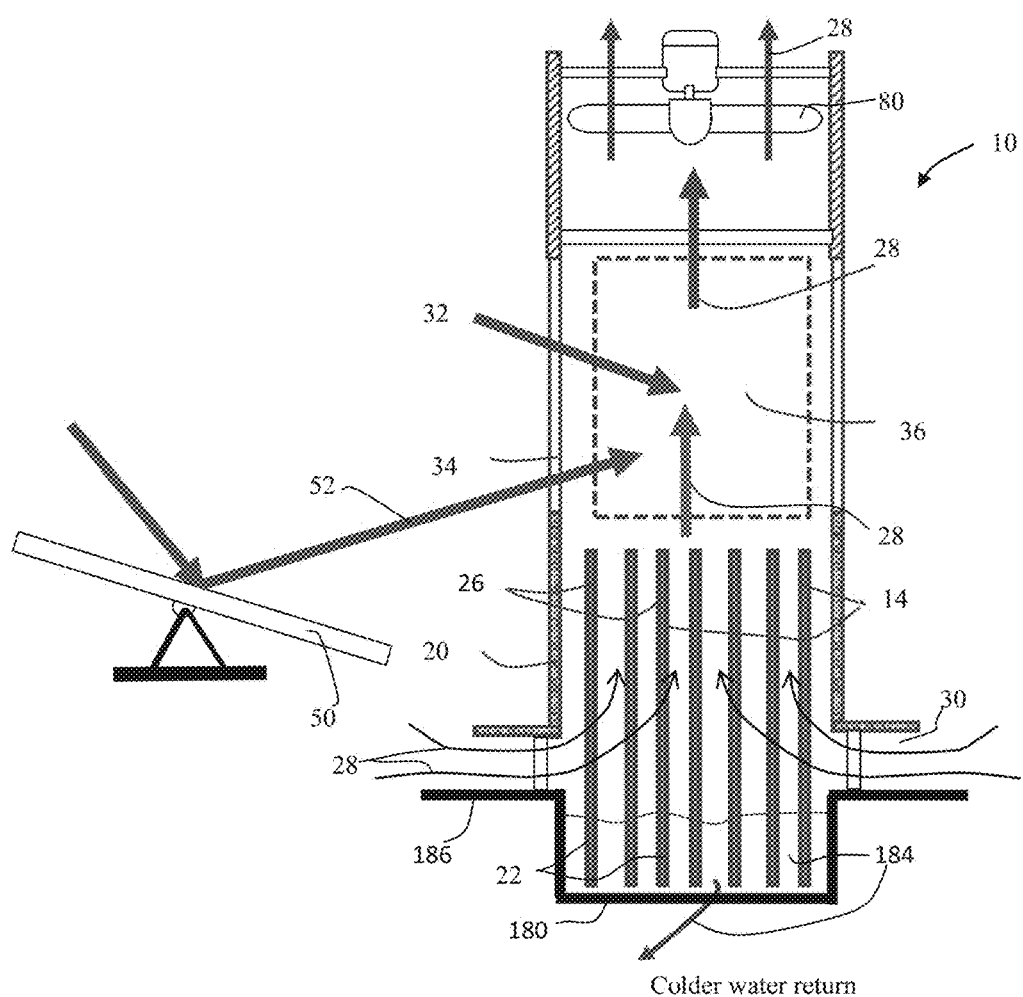
FIG. 10 shows a schematic illustration of a sectional view of a dry cooling system for removing heat from the condenser cooling water in a canal.

FIG. 10 shows a schematic illustration of a sectional view of a dry cooling system according to an embodiment of the subject invention under open water flow loop. Under the heat removal from the condenser cooling water in terms of an open water flow loop, for example, for a power plant (a thermoelectric power plant, nuclear power plant, or CSP plant) that uses water from a reviver, an ocean, or a reservoir to cool condensers, the release of the cooling water from the condenser may be subjected to the regulation of allowable temperature level. In this embodiment, the dry cooling system may be employed to cool the condenser cooling water to an acceptably low level before it is released back to the river, ocean, or reservoir. FIG. 10 shows a dry cooling system to remove heat from the condenser cooling water flow in a canal before the water is released back to the river, ocean, or reservoir. Referring to FIG. 10, the heat pipe evaporator sections 22 are deployed in a canal 180 and remove heat from the water 184 flowing in the canal 180. The air duct 20 of the dry cooling system integrated with the heat pipes is disposed on top of the canal 180 and supported by the bank 186 of the canal 180. The deployment of the dry cooling system may be modular or portable. In a season when the dry cooling system is not needed for cooling the water exiting the condenser, the dry cooling system may be removed from the canal 180, but may be reinstalled conveniently whenever such cooling purpose is needed.

The dry cooling system of a subject invention is not only for the applications related to power plants and air conditioning/refrigeration systems, both of which may require a heavy cooling load but with limited temperature differences for heat transfer. One of the most important features of embodiments of the subject invention is to provide a dry cooling system that consumes no or significantly reduced fan power. As such, the dry cooling system may be employed for any applications involving the cooling of a medium or substance. These applications may include, but not limited to: cooling of electric systems, such as power transformers and electric generators/motors; cooling of electronic systems such as removing heat from the coolant of cold plates for electronic modules, stacks of circuits modules, and processor units; cooling of fuel cell systems; cooling of internal combustion engines for power generation; and compression intercooling for multi-stage compressors.

Figure 11:
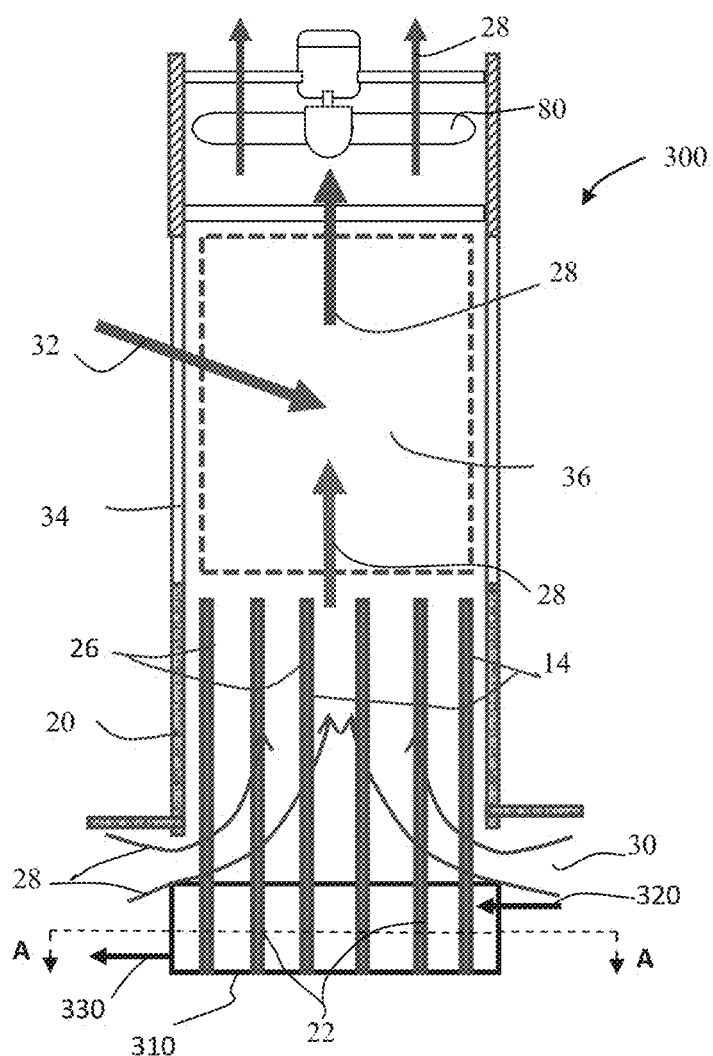
FIG. 11 shows a schematic illustration of a sectional view of a dry cooling system for cooling of an electric system.

FIG. 11 shows a schematic illustration of a sectional view of a dry cooling system for the cooling of an electric system such as a power transformer or electric generator/motor. In the dry cooling system 300 for the electric system, a coolant 320 of the electric system (not shown) with a higher temperature exits the electric system and enters a cooler 310 where heat is removed from the coolant 320 by the heat pipe evaporator sections 22 that are deployed inside the cooler 310. The coolant 320 of the electric system with a lowered temperature 330 exits the cooler 310 and returns back to the electric system to remove heat from the electric system and is then circulated back to the inlet of the cooler 310.

Figure 12:
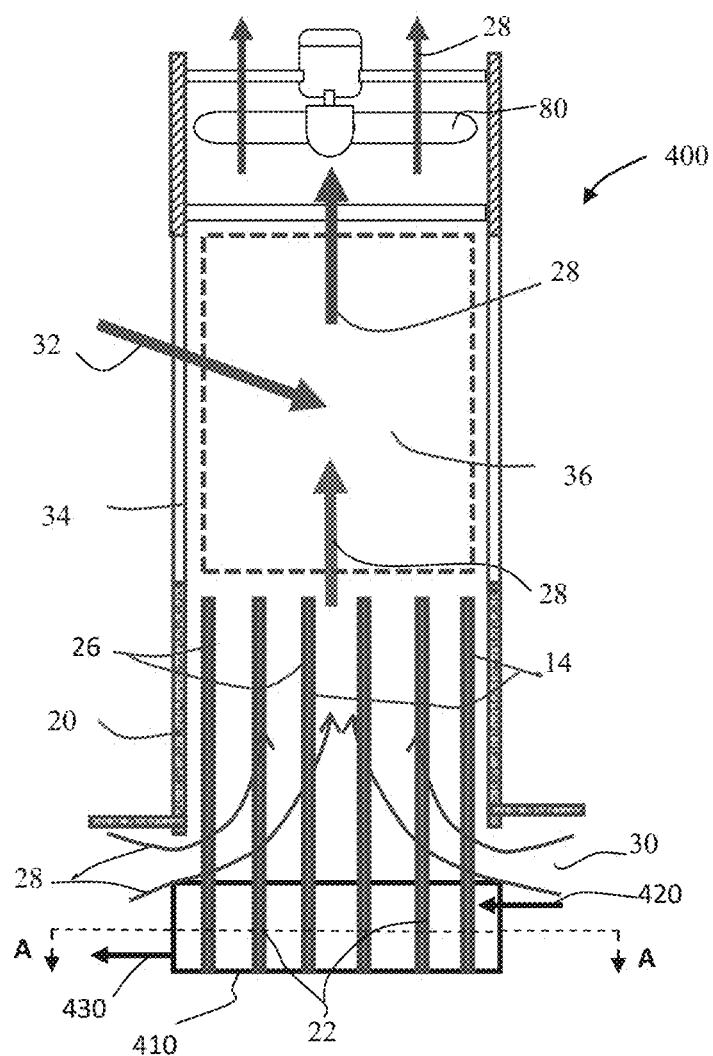
FIG. 12 shows a schematic illustration of a sectional view of a dry cooling system for cooling of an electronic system.

FIG. 12 shows a schematic illustration of a sectional view of a dry cooling system for the cooling of an electronic system, such as an electronic module, stack of circuit modulus, or processor units. In the dry cooling system 400 of FIG. 12, the coolant 420 of the electronic system (not shown) with a higher temperature exits the electronic system and enters a cooler 410 where heat is removed from the coolant 420 by the heat pipe evaporator sections 22 that are deployed inside the cooler 410. The coolant 420 of the electronic system with a lowered temperature 430 exits the cooler 410 and returns back to the electronic system to remove heat from the electronic system and is then circulated back to the inlet of the cooler 410.

Figure 13:
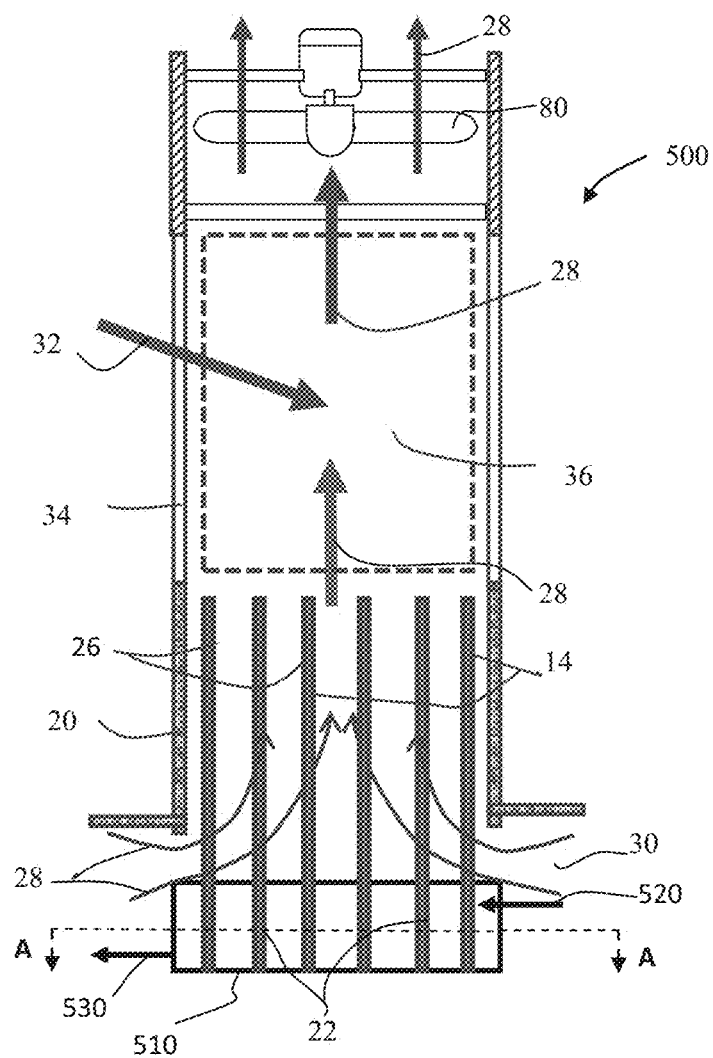
FIG. 13 shows a schematic illustration of a sectional view of a dry cooling system for cooling of a fuel cell system.

FIG. 13 shows a schematic illustration of a sectional view of a dry cooling system for the cooling of a fuel cell system. In the dry cooling system 500 of FIG. 13, the coolant 520 of the fuel cell system (not shown) with a higher temperature exits the fuel cell system and enters a cooler 510 where heat is removed from the coolant 520 by the heat pipe evaporator sections 22 that are deployed inside the cooler 510. The coolant 520 of the fuel cell system with a lowered temperature 530 exits the cooler 510 and returns back to the fuel cell system to remove heat from the fuel cell system and is then circulated back to the inlet of the cooler 510.

Figure 14:
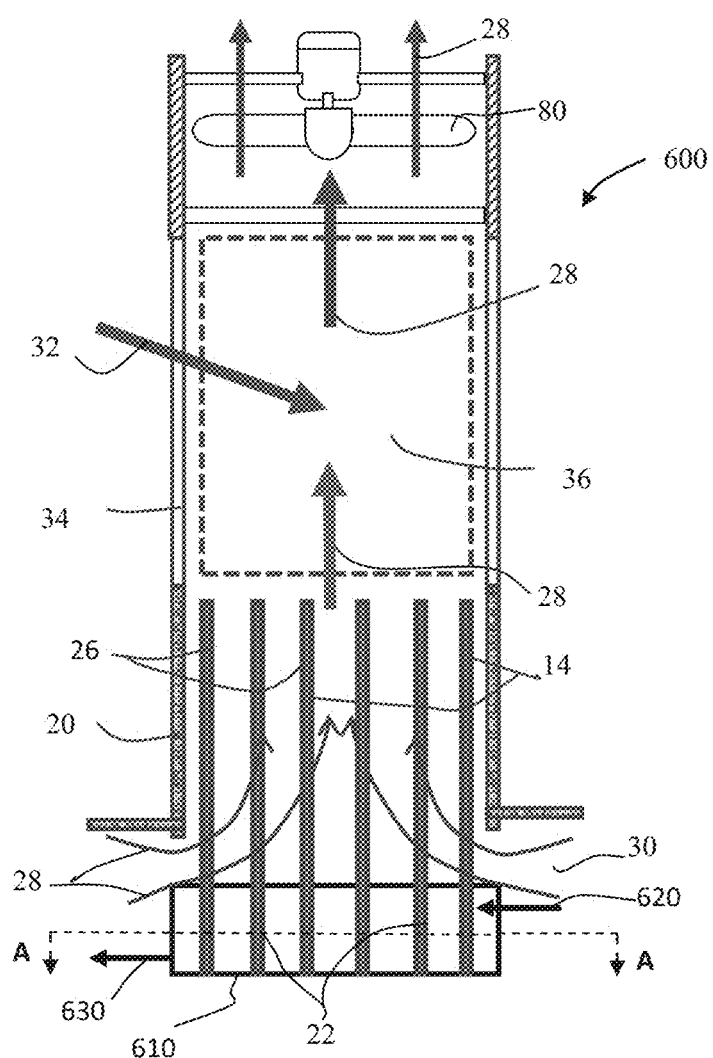
FIG. 14 shows a schematic illustration of a sectional view of a dry cooling system for cooling of an internal combustion engine.

FIG. 14 shows a schematic illustration of a sectional view of a dry cooling system for the cooling of an internal combustion (IC) engine. In the dry cooling system 600 of FIG. 14, the coolant 620 of the IC engine system (not shown) with a higher temperature exits the IC engine system and enters a cooler 610 where heat is removed from the coolant 620 by the heat pipe evaporator sections 22 that are deployed inside the cooler 610. The coolant 620 of the IC engine system with a lowered temperature 630 exits the cooler 610 and returns back to the IC engine system to remove heat from the IC engine system and is then circulated back to the inlet of the cooler 610.

Although for different applications, the configurations of the corresponding coolers as shown in FIGS. 11-14 may be different. However, the respective cross-sectional illustrations in the direction A-A of these figures may bear some similarity to that shown in FIG. 9, involving flow baffles and a serpentine flow path.

Figure 15:
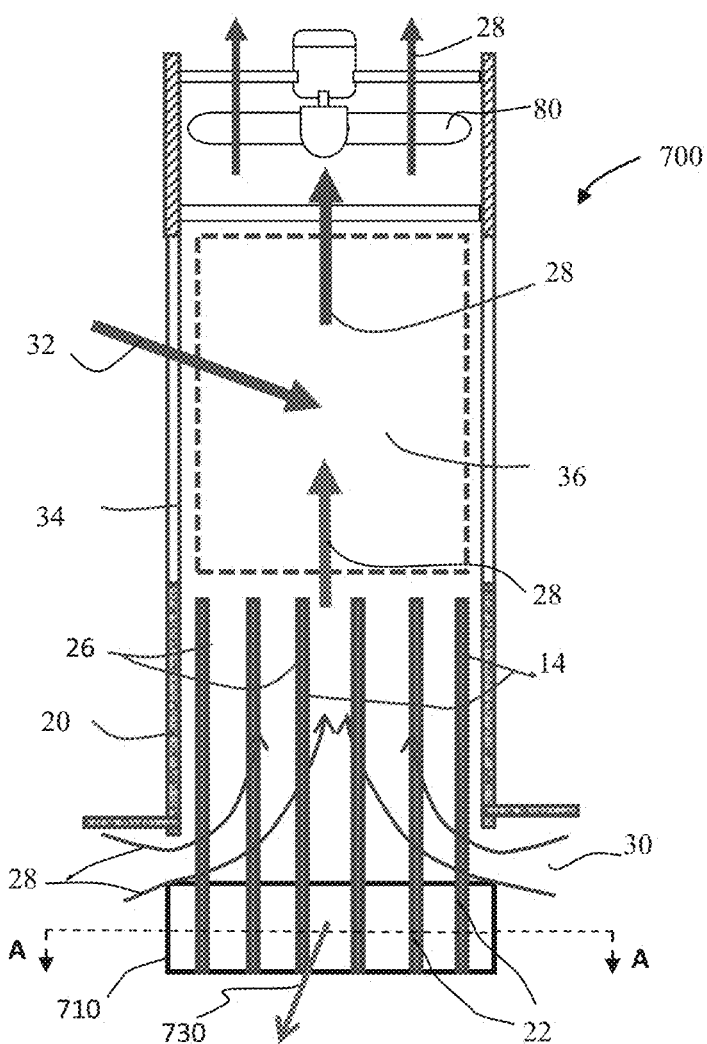
FIG. 15 shows a schematic illustration of a sectional view of a dry cooling system for intercooling of a compressor system.
Figure 16:
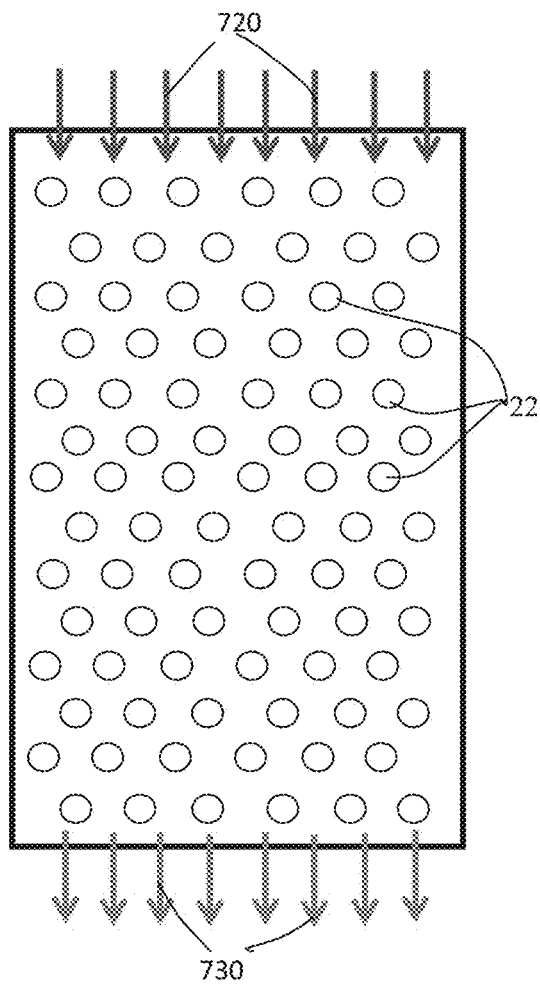
FIG. 16 shows a cross-sectional illustration taken along line A-A of FIG. 15.

FIG. 15 shows a schematic illustration of a sectional view of a dry cooling system for the intercooling of a compressor system and FIG. 16 shows a cross-sectional illustration taken along line A-A of FIG. 15. Referring to FIGS. 15 and 16, the dry cooling system 700 comprises an intercooler 710 in which the heat pipe evaporator sections 22 are located. Airflow 720 (FIG. 16) from a lower pressure compressor or compressor stage (not shown) with a higher temperature exits the lower pressure compressor and enters the intercooler 710 where heat is removed from the airflow by the heat pipe evaporator sections 22 that are deployed inside the cooler 710. The airflow 730 with a lowered the temperature exits the cooler 710 and is ducted to a higher pressure compressor or compressor stage for further compression (not shown).

For all of the dry cooling systems, when the solar energy is not available, the airflow stream in the air duct may bypass the solar absorbing elements and is discharged back to the ambient after flowing through the heat pipe condenser sections for operational flexibility. Again, for all of the dry cooling systems, if the buoyancy force induced free convection is sufficient for the cooling, both the solar heating and the fan may be removed. If the combination of the buoyancy force induced free convection and solar heating is sufficient for the cooling, the fan may be removed or non-functioning. Also, the top solar energy input configurations as shown in FIGS. 6(a) and 6(b) as well as the use of solar collectors may be applicable to any disclosed dry cooling systems although they are not shown in some of the illustrations.

The construction of the solar windows as shown in the illustrations may be flexible and may have single or multiple glass covers and the interspaces between adjacent glass layers may also be evacuated.

Finally, for many natural-convection cooled systems, the deployment of the dry cooling system in accordance with embodiments of the present invention could provide enhanced heat transfer or reduced heat transfer surface area.

Embodiments of the present invention provide dry cooling systems that combine heat-pipe heat spreading, buoyancy-induced free convection cooling, and solar energy induced air draft to cool power plant condensers, air conditioning/refrigerator condensers, and other relevant heat sources. Embodiments of the present invention can significantly reduce the use of fresh water resource for power plants and commercial scale refrigeration systems using cooling towers. Embodiments of the present invention can also significantly reduce the fan power consumption for many industrial systems.

The subject invention includes, but is not limited to, the following exemplified embodiments.

Embodiment 1

A dry cooling system, comprising:
at least a heat pipe system, said heat pipe system has an evaporator section in contact with a heat source being cooled and a condenser section to dissipate received heat from said heat source into air, and an airflow duct, said heat pipe condenser section being disposed inside said airflow duct and transferring received heat to the airflow inside said duct, and thereby buoyancy force induced flow is promoted to enhance heat transfer from said heat pipe condenser to the airflow inside said duct.

Embodiment 2

The dry cooling system according to embodiment 1, wherein said air duct further includes a solar transparent windows section and a solar absorbing element system, said solar transparent section receiving solar beams that are subsequently transmitted into said air duct and are absorbed by said solar absorbing element system, said element system transferring heat to the airflow inside the duct and providing further buoyancy force or draft to promote airflow through said heat pipe condenser section.

Embodiment 3

The dry cooling system according to any of embodiments 1-2, wherein said air duct has an enlarged solar transparent surface on top of said duct and said solar absorbing element system receives solar beams from the top of said dry-cooling system.

Embodiment 4

The dry cooling system according to any of embodiments 1-2, wherein said solar absorbing element system forms at least an airflow space wherein the exterior surface of said solar absorbing element system absorbs solar energy and transfers absorbed heat to the airflow inside the airflow space.

Embodiment 5

The dry cooling system according to any of embodiments 1-2, wherein said solar absorbing element system is integrated with a thermal energy storage system, said thermal energy storage system storing solar energy when solar beams are available while releasing the stored heat to the airflow inside said airflow space when solar beams are not available.

Embodiment 6

The dry cooling system according to any of embodiments 1-2, wherein said solar absorbing element system receives solar energy directed from a solar collector system to further enhance buoyancy force or draft for the airflow inside said air duct.

Embodiment 7

The dry cooling system according to embodiment 1, wherein a fan system is disposed to enhance airflow through said heat pipe condenser section inside said air duct.

Embodiment 8

The dry cooling system according to any of embodiments 1-2, wherein a fan system is disposed to enhance airflow through said heat pipe condenser section.

Embodiment 9

The dry cooling system according to embodiment 1, wherein said heat source being cooled is the cooling water of a power plant.

Embodiment 10

The dry cooling system according to embodiment 1, wherein said heat source being cooled is the steam in a condenser of a power plant.

Embodiment 11

The dry cooling system according to any of embodiments 1-2, wherein said heat source being cooled is the cooling water of a power plant.

Embodiment 12

The dry cooling system according to any of embodiment 1-2, wherein said heat source being cooled is the steam in a condenser of a power plant.

Embodiment 13

The dry cooling system according to embodiment 1, wherein said heat source being cooled is the cooling water of a centralized air conditioning system or a centralized refrigeration system.

Embodiment 14

The dry cooling system according to embodiment 1, wherein said heat source being cooled is the vapor in a condenser of an air conditioning system or a refrigeration system.

Embodiment 15

The dry cooling system according to any of embodiment 1-2, wherein said heat source being cooled is the cooling water of a centralized air conditioning system or a centralized refrigeration system.

Embodiment 16

The dry cooling system according to any of embodiments 1-2, wherein said heat source being cooled is the vapor in a condenser of an air conditioning system or a refrigeration system.

Embodiment 17

The dry cooling system according to embodiment 1, wherein said heat source being cooled is the cooling water of a power plant, said cooling water exiting a condenser of said power plant and returning to a river, an ocean, or a reservoir.

Embodiment 18

The dry cooling system according to any of embodiments 1-2, wherein said heat source being cooled is the cooling water of a power plant, said cooling water exiting a condenser of said power plant and returning to a river, an ocean, or a reservoir.

Embodiment 19

A dry cooling system, comprising: an air duct; and a heat pipe including an evaporator section configured to be in contact with a heat source and a condenser section connected to the evaporator section, the condenser section being located in the air duct.

Embodiment 20

The dry cooling system according to embodiment 19, further comprising an opening disposed below the air duct such that an air enters through the opening and flows to the condenser section.

Embodiment 21

The dry cooling system according to any of embodiments 19-20, further comprising a window disposed in an upper portion of the air duct.

Embodiment 22

The dry cooling system according to any of embodiments 19-21, further comprising a solar absorbing element disposed in the air duct and corresponding to the window.

Embodiment 23

The dry cooling system according to any of embodiments 21-22, the window being a side window disposed in a side surface of the air duct.

Embodiment 24

The dry cooling system according to embodiment 23, the side window bent from the side surface of the air duct.

Embodiment 25

The dry cooling system according to any of embodiments 21-22, the window being a top window covering the air duct.

Embodiment 26

The dry cooling system according to any of embodiments 22-25, the solar absorbing element including a thermal energy storage material.

Embodiment 27

The dry cooling system according to any of embodiments 22-26, further comprising a partition between the solar absorbing element and the condenser section.

Embodiment 28

The dry cooling system according to any of embodiments 22-29, further comprising a solar collector providing a solar beam to the solar absorbing element through the window.

Embodiment 29

The dry cooling system according to any of embodiments 20-28, further comprising a fan disposed over the condenser section.

Embodiment 30

The dry cooling system according to any of embodiments 20-29, further comprising a heat source flow duct including the heat source.

Embodiment 31

The dry cooling system according to embodiment 30, the evaporator section being located inside the heat source flow duct.

Embodiment 32

The dry cooling system according to any of embodiments 30-31, the heat source flow duct including a baffle providing a serpentine flow path, and the evaporator section being located in the serpentine flow path.

Embodiment 33

A dry cooling system, comprising:
a heat source flow duct;
an air duct disposed over the heat source flow duct;
an opening between the heat source flow duct and the air duct such that an air flows through the opening; and a heat pipe including an evaporator section disposed in the heat source flow duct and a condenser section disposed in the air duct, the air flowing from the opening to the condenser section.

Embodiment 34

The dry cooling system according to embodiment 33, further comprising a side window disposed on a side surface of the air duct and a solar absorbing element disposed over the condenser section.

Embodiment 35

The dry cooling system according to embodiment 34, the solar absorbing element including a thermal energy storage material and an air flow space which the air flows through.

Embodiment 36

The dry cooling system according to any of embodiments 34-35, further comprising a solar collector providing a solar beam to the solar absorbing element through the side window.

Embodiment 37

The dry cooling system according to any of embodiments 34-36, further comprising a fan disposed over the solar absorbing element.

Embodiment 38

The dry cooling system according to any of embodiments 33-37, the heat source flow duct including at least one of a steam in a condenser of a power plant, a cooling water of the power plant, a cooling water of an air conditioning system or a refrigeration system, and a vapor in a condenser of the air conditioning system or the refrigeration system.

Embodiment 39

A dry cooling system, comprising:
a heat source flow duct including a heat source;
an air duct disposed over the heat source flow duct;
an opening between the heat source flow duct and the air duct;
a heat pipe including an evaporator section disposed in the heat source of the heat source flow duct and a condenser section disposed in the air duct;
a window disposed on the air duct;
a solar absorbing element disposed over the condenser section; and
a fan disposed over the solar absorbing element,
the dry cooling system being configured to allow an air to flow from the opening to outside of the air duct through the condenser section, the solar absorbing element, and the fan.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:
1. A dry cooling system, comprising:
an air duct; and
a heat pipe including an evaporator section configured to be in contact with a heat source and a condenser section connected to the evaporator section,
the condenser section being located in the air duct,
the dry cooling system further comprising:
an opening disposed below the air duct such that an air enters through the opening and flows to the condenser section; and
a heat source flow duct including the heat source,
the evaporator section being located inside the heat source flow duct,
the heat source flow duct including a baffle providing a serpentine flow path, and
the evaporator section being located in the serpentine flow path.
2. The dry cooling system according to claim 1, further comprising a window disposed in an upper portion of the air duct.
3. The dry cooling system according to claim 2, further comprising a solar absorbing element disposed in the air duct and corresponding to the window.
4. The dry cooling system according to claim 3, the window being a side window disposed in a side surface of the air duct.
5. The dry cooling system according to claim 4, the side window bent from the side surface of the air duct.
6. The dry cooling system according to claim 3, the window being a top window covering the air duct.
7. The dry cooling system according to claim 3, the solar absorbing element including a thermal energy storage material.
8. The dry cooling system according to claim 3, further comprising a partition between the solar absorbing element and the condenser section.
9. The dry cooling system according to claim 3, further comprising a solar collector providing a solar beam to the solar absorbing element through the window.
10. The dry cooling system according to claim 1, further comprising a fan disposed over the condenser section.
11. A dry cooling system, comprising:
a heat source flow duct;
an air duct disposed over the heat source flow duct;
an opening between the heat source flow duct and the air duct such that an air flows through the opening; and
a heat pipe including an evaporator section disposed in the heat source flow duct and a condenser section disposed in the air duct,
the air flowing from the opening to the condenser section,
the dry cooling system further comprising side window disposed on a side surface of the air duct and a solar absorbing element disposed over the condenser section, and
the solar absorbing element including a thermal energy storage material and an air flow space which the air flows through.
12. The dry cooling system according to claim 11, further comprising a solar collector providing a solar beam to the solar absorbing element through the side window.
13. The dry cooling system according to claim 11, further comprising a fan disposed over the solar absorbing element.
14. The dry cooling system according to claim 11, the heat source flow duct including at least one of a steam in a condenser of a power plant, a cooling water of the power plant, a cooling water of an air conditioning system or a refrigeration system, and a vapor in a condenser of the air conditioning system or the refrigeration system.

15. A dry cooling system, comprising:
a heat source flow duct including a heat source;
an air duct disposed over the heat source flow duct;
an opening between the heat source flow duct and the air duct;
a heat pipe including an evaporator section disposed in the heat source of the heat source flow duct and a condenser section disposed in the air duct;
a window disposed on the air duct;
a solar absorbing element disposed over the condenser section; and
a fan disposed over the solar absorbing element,
the dry cooling system being configured to allow an air to flow from the opening to outside of the air duct through the condenser section, the solar absorbing element, and the fan, and
the solar absorbing element including a thermal energy storage material and an air flow space which the air flows through.

* * * * *